(12) United States Patent
Mosbach et al.

(10) Patent No.: US 9,669,849 B2
(45) Date of Patent: Jun. 6, 2017

(54) WHEEL BRAKE DISC

(71) Applicant: KNORR-BREMSE SYSTEME FÜR SCHIENENFAHRZEUGE GMBH, Munich (DE)

(72) Inventors: Christian Mosbach, Alling (DE); Florian Walther, Munich (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 99 days.

(21) Appl. No.: 14/418,936

(22) PCT Filed: Jul. 23, 2013

(86) PCT No.: PCT/EP2013/065543
§ 371 (c)(1),
(2) Date: Jan. 31, 2015

(87) PCT Pub. No.: WO2014/019895
PCT Pub. Date: Feb. 6, 2014

(65) Prior Publication Data
US 2015/0232108 A1 Aug. 20, 2015

(30) Foreign Application Priority Data
Aug. 3, 2012 (DE) .................. 10 2012 015 378

(51) Int. Cl.
*F16D 65/12* (2006.01)
*B61H 5/00* (2006.01)
(52) U.S. Cl.
CPC ............. *B61H 5/00* (2013.01); *F16D 65/124* (2013.01)

(58) Field of Classification Search
CPC ........ B61H 5/00; F16D 65/124; F16D 65/123
USPC ......... 188/218 XL, 18 A, 58, 59, 71.1, 73.2, 188/205 R, 206 R, 218 A; 192/70.16, 192/70.17
See application file for complete search history.

(56) References Cited

U.S. PATENT DOCUMENTS 3,513,949 A * 5/1970 Klassen ................ F16D 65/124
                                                      188/218 R
3,606,937 A * 9/1971 Falch .................... F16D 65/124
                                                      188/218 XL
(Continued)

FOREIGN PATENT DOCUMENTS

CN        202215642 U    5/2012
DE        4211847 A1    10/1993
(Continued)

OTHER PUBLICATIONS

Search Report for International Patent Application No. PCT/EP2013/065543; Oct. 10, 2013.
(Continued)

*Primary Examiner* — Pamela Rodriguez
(74) *Attorney, Agent, or Firm* — Barnes & Thornburg LLP

(57) ABSTRACT

A wheel brake disc for a wheel of a rail vehicle, wherein the wheel has a wheel web, on which friction rings are supported which are fastened to the wheel web, wherein each friction ring has spring elements arranged in each case on the circumference of the friction rings, wherein, in the mounted state of the wheel brake disc, the spring elements are arranged in each case between the friction rings and the wheel web.

26 Claims, 8 Drawing Sheets

(56) References Cited

U.S. PATENT DOCUMENTS

| | | | | |
|---|---|---|---|---|
| 3,877,551 | A | * | 4/1975 | Gebhardt .............. F16D 65/124 |
| | | | | 188/218 XL |
| 4,825,981 | A | * | 5/1989 | Otto ...................... F16D 65/123 |
| | | | | 188/218 XL |
| 5,010,985 | A | | 4/1991 | Russell et al. |
| 5,101,940 | A | * | 4/1992 | Mungo ................. F16D 65/124 |
| | | | | 188/218 XL |
| 5,137,122 | A | | 8/1992 | Watson |
| 5,158,511 | A | | 10/1992 | Mungo |

FOREIGN PATENT DOCUMENTS

| | | | |
|---|---|---|---|
| DE | 4417813 | A1 | 11/1995 |
| DE | 10047980 | A1 | 4/2002 |
| DE | 10336729 | A1 | 3/2005 |
| EP | 0429211 | A1 | 5/1991 |
| EP | 0447140 | A1 | 9/1991 |
| EP | 0809037 | A2 | 11/1997 |
| JP | 2008291877 | A | 12/2008 |

OTHER PUBLICATIONS

English Translation of Written Opinion of the International Search Authority for International Patent Application No. PCT/EP2013/065543 dated Jul. 23, 2013 and International Search Report.

Chinese Office Action for Chinese Application No. 201380047675.5, dated May 4, 2016.

Jie Zuoteng, et al., "Noises and Vibration of a Highs-Speed Train Which Is Provided With Elastic Wheels and Brake Disc", Foreign Railway Locomotive and Motor Car, vol. 12, pp. 38-44, Dec. 31, 1997.

Liugen Chen et al., "Analysis About Tensile Strength Too Low of Brake Block of Locomotive", Hebei Metallurgy, vol. 7, pp. 58-60, Jul. 31, 2011.

Xiaoze Xiaoyuan, et al., "Brake Disc for High-Speed Train", Foreign Locomotive and Rolling Stock Technology, vol. 2, pp. 39*42, Mar. 31, 2008.

* cited by examiner

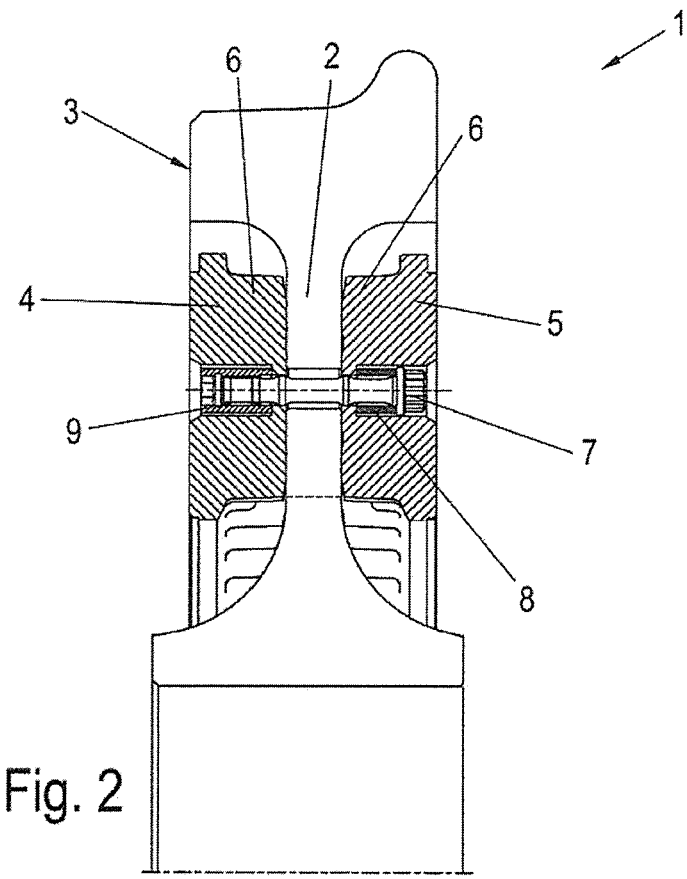
PRIOR ART Fig. 2
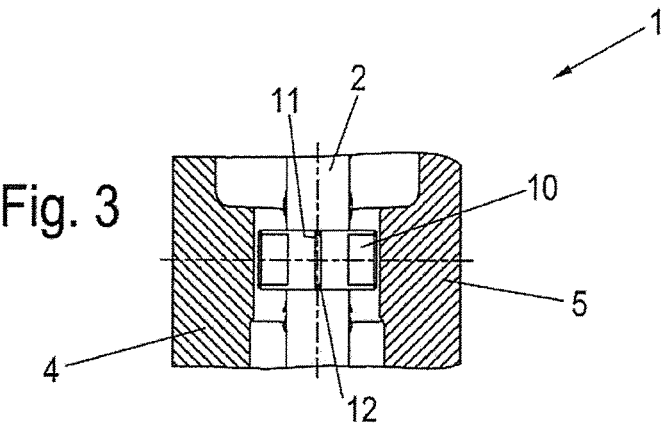
PRIOR ART Fig. 3

WHEEL BRAKE DISC

PRIORITY CLAIM

This patent application is a U.S. National Phase of International Patent Application No. PCT/EP2013/065543, filed 23 Jul. 2013, which claims priority to German Patent Application No. 10 2012 015 378.3, filed 3 Aug. 2012, the disclosures of which are incorporated herein by reference in their entirety.

FIELD

Disclosed embodiments relate to a wheel brake disk.

BRIEF DESCRIPTION OF THE FIGURES

Exemplary embodiments of a wheel brake disk are shown in the drawings and will be described in greater detail in the following text. In the drawings:

FIG. 2 shows a sectional illustration of a wheel brake disk from the prior art according to FIG. 1 in which the friction rings are screwed together and sliding blocks are used for centering purposes;

FIG. 3 shows a further sectional illustration of a wheel brake disk from the prior art according to FIG. 1 in which the friction rings are screwed together and sliding blocks are used for centering purposes;

DETAILED DESCRIPTION OF THE DISCLOSED EMBODIMENTS

Disclosed embodiment provide a wheel brake disk for a wheel of a rail vehicle, in which wheel brake disk each friction ring has a plurality of spring elements which are arranged in each case on the circumference of the friction ring, the spring elements being arranged in the mounted state of the wheel brake disc in each case between the friction rings and the wheel web.

The disclosed embodiments are based on the concept of designing the wheel brake disk in such a way that the primary screw connections, that is to say the screw connection, by way of which the friction rings are connected to the wheel web, are free from relative movements, resulting from the thermomechanical loading, and the spring elements therefore compensate for the deformation.

The spring element is configured in such a way that all relative movements which occur lie in terms of their magnitude in the range of elastic deformation of the spring elements. This leads to the primary screw connection of the wheel brake disk and therefore also the spring elements not performing a relative movement in the direction of the wheel web via the region of the attachment to the wheel web.

Furthermore, the spring elements are configured so that the maximum geometrical moment of inertia can act in the circumferential direction and the attachment elements are thus deformed only slightly by way of the influence of the braking torque, but nevertheless permit a radial expansion, that is to say a parallel displacement of the friction face with respect to the wheel as a result of thermal load.

Further embodiments of the wheel brake disk can be gathered from the dependent claims.

Figure 1:
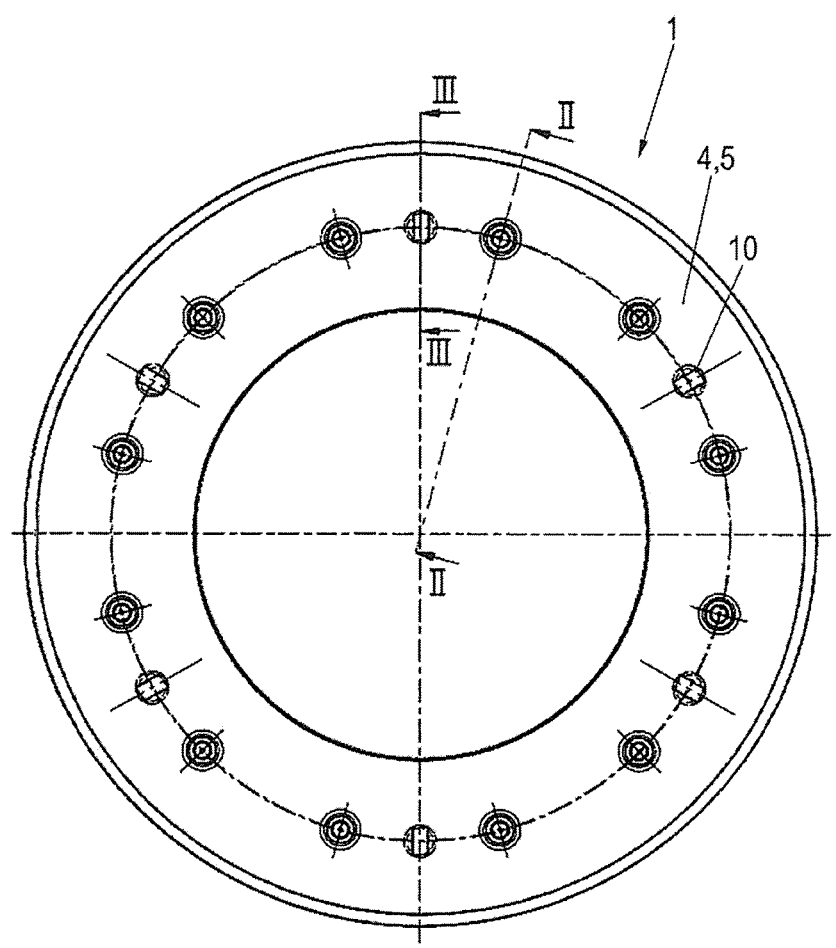
FIG. 1 shows a front view of a wheel brake disk from the prior art according to FIG. 1 in which the friction rings are screwed together and sliding blocks are used for centering purposes.

FIGS. 1, 2 and 3 show the principle construction of a wheel brake disk 1 according to the prior art, as is used, in particular, in the case of rail vehicles. In each case one friction ring 4, 5 is arranged on the wheel web 2 of the wheel 3 of a rail vehicle symmetrically with respect to the axis of symmetry of the wheel web 2. Here, the friction ring 4, 5 is supported via fins 6 on the wheel web 2. The friction rings 4, 5 are screwed to the wheel web 2 by way of screws which are configured as anti-fatigue bolts. To minimize the thermal expansion of the screw connection, the screw head 7 is supported on a sleeve 8 which is let into the friction ring 5 via a counterbore. The nut 9 is likewise designed as a sleeve which is let into the friction ring 4 via a counterbore. The positively locking fit of the connection is produced by way of separate sliding blocks 10.

Figure 4:
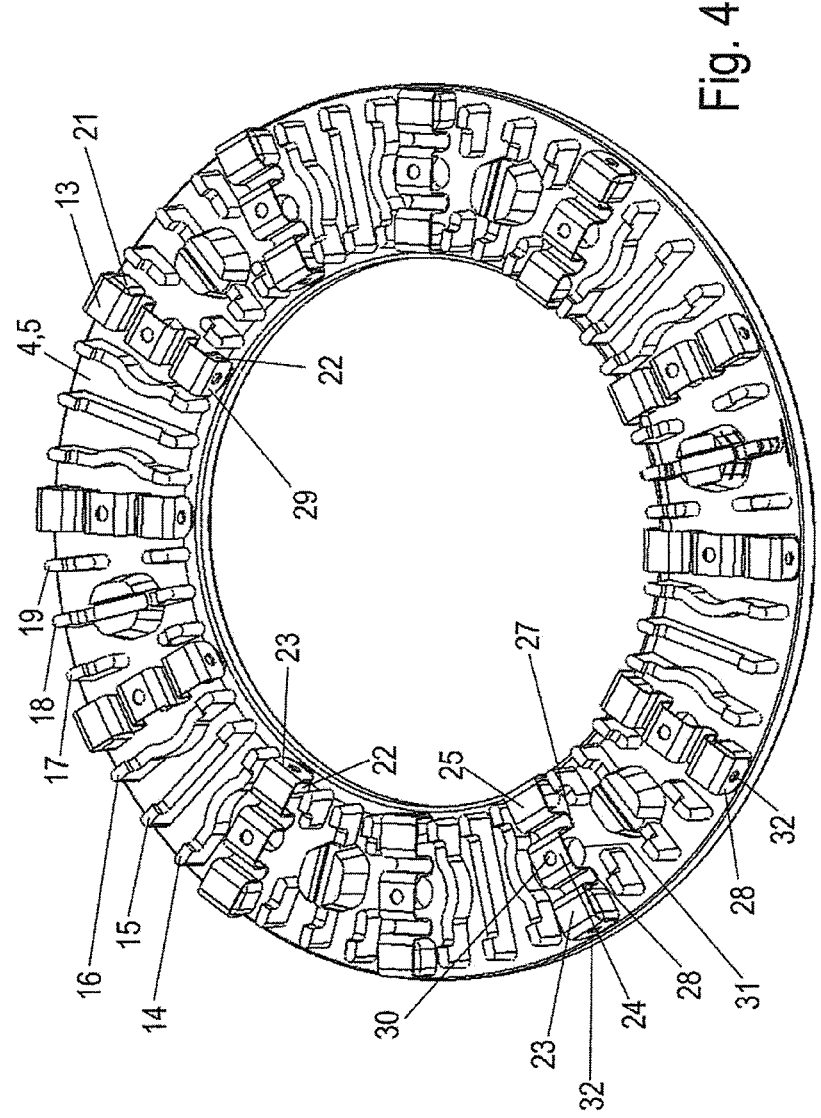
FIG. 4 shows a three-dimensional front view of a friction ring with inserted strip-shaped spring elements of a wheel brake disk.
Figure 5:
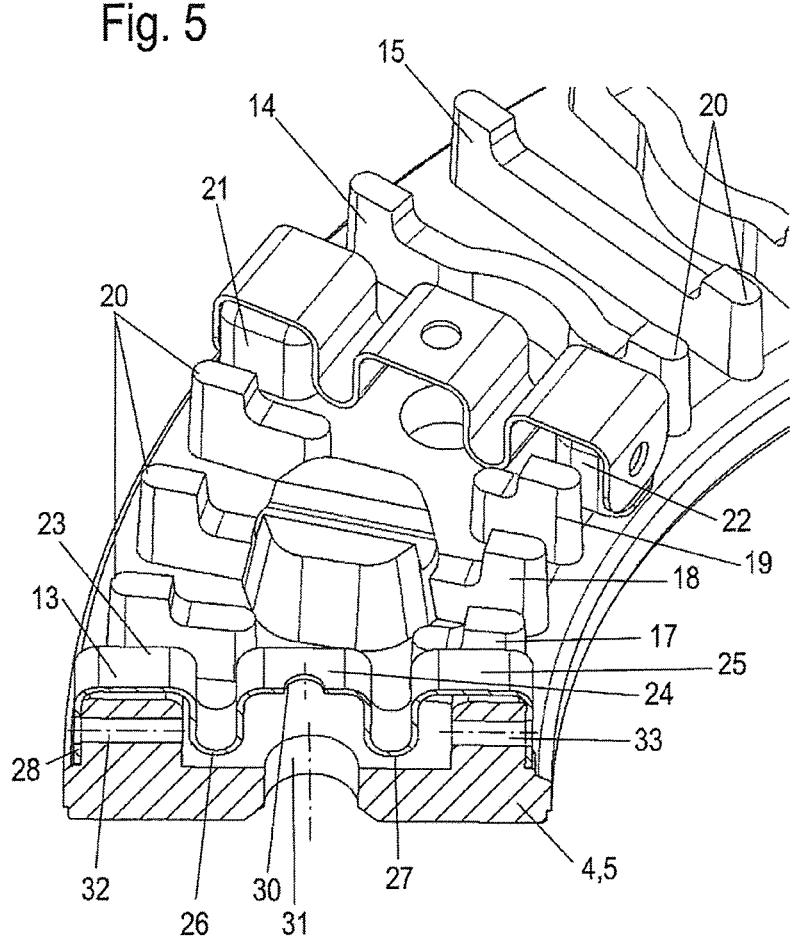
FIG. 5 shows an enlarged detail of the front view from FIG. 4 of a friction ring with one design embodiment of the inserted strip-shaped spring elements of a wheel brake disk.

FIGS. 4 and 5 show by way of example a three-dimensional front view of a friction ring 4, 5 with inserted spring elements 13 of a wheel brake disk 1. On the wheel web side, the friction ring 4, 5 has fins or cams 14, 15, 16, 17, 18, 19 of different geometry which are elevated in the radial direction in relation to the wheel web and run substantially in the axial direction. The fins or cams 14, 15, 16, 17, 18, 19 are arranged in two defined, repeating patterns on the friction ring 4, 5, which patterns are arranged on the circumference of the friction ring 4, 5 multiple times with a quantity which can be divided by an integer, optionally six times. Here, the first pattern is formed by the fins 14, 15, 16, whereas the second pattern is formed by the cams 17, 18 and 19. The patterns are separated from one another in each case by the arrangement of a spring element 13, with the result that 12 spring elements are arranged uniformly on the circumference of the friction ring 4, 5 in the case of the patterns being divided six times. In principle, it is also possible to arrange fewer or more than 12 spring elements 13 on the circumference of the friction ring 4, 5 and therefore also to arrange the patterns more or less frequently than six times.

The geometry of the fins or cams 14, 15, 16, 17, 18, 19 is selected in such a way that a deformation of the friction ring 4, 5 takes place as uniformly as possible in terms of the magnitude in the axial direction in relation to the wheel 3 on account of the heat which is introduced by the braking operation. Moreover, the geometry of the fins or cams 14, 15, 16, 17, 18, 19 is selected in such a way that heat dissipation by convection which is as high as possible takes place when the wheel 3 rotates. Furthermore, the fins or cams 14, 15, 16, 17, 18, 19 are designed in principle in such a way that they bear only at their respective two ends 20 against the wheel web 2, with the result that the heat input from the friction rings 4, 5 into the wheel web 2 is reduced to a minimum by way of the geometrical design of the fins or cams 14, 15, 16, 17, 18, 19.

The pattern which is formed by the fins 14, 15 and 16 is a symmetrical pattern, the line of symmetry of which is formed by the line of symmetry of the fin 15. Fin 15 is a straight fin which extends in the beam-shaped radial direction in relation to the wheel 3. The fin 15 has a lower height in its middle section than at its two ends 20, with the result that the fin 15 makes contact with the wheel web 2 only via its ends 20. The fins 14 and 16 extend spaced apart on both sides from the fin 15. Both fins 14, 16 have an arcuate middle section, the middle section having a lower height than the respective ends 20 of the fins 14 and 16. The depressed middle section of the fins 14, 16 is also continued beyond the arc in each case in the direction of the ends 20 of the fin 14, 16. The vertex of the arc of the middle section of the fins 14 and 16 points in each case toward the fin 15 here, with the result that a symmetrical pattern is produced, the line of symmetry of which is formed by the line of symmetry of the fin 15.

The pattern which is formed by the cams or fins 17, 18 and 19 is a symmetrical pattern, the line of symmetry of which is formed by the line of symmetry of the fin 18. The fin 18 has a cam-shaped middle section, the fin 18 overall extending in the beam-shaped radial direction in relation to the wheel 3. The fin 18 has a lower height in its middle section than at its two ends 20, with the result that the fin 18 makes contact with the wheel disk 2 only via its ends 20. Here, the depressed middle section of the fin 18 runs in a stepped manner, with the result that the middle section has a lower depth in the cam-shaped middle part of the fin 18 than in the two fin parts which lie outside the cam-shaped middle section of the fin 18. Here, the cam-shaped middle part is penetrated by the depression in a groove-shaped manner, the groove width corresponding to the width of the fin parts which are situated outside the cam-shaped middle part of the fin 18. The cam pairs 17 and 19 extend spaced apart from the fin 18 on both sides. Both cam pairs 17, 19 have a basic geometry which corresponds to the fin 15, the height of the middle section of the cam pairs 17 and 19 coinciding with the height of that plane of the friction rings 4, 5 which faces the wheel disk 2 and from which the fins or cams 14, 15, 16, 17, 18 and 19 rise, so that continuous fins do not result, but rather in each case two cam pairs 17 and 19. The respectively inner section of the cams of a cam pair 17, 19 has a lower height than the end section 20 of the respective cam, with the result that only the respective end section 20 of the cam is supported on the wheel web 2 in the mounted state of the friction linings 4, 5.

The depressed middle part of the fins 14, 15, 16, the depressed section of the two fin parts which lie outside the cam-shaped middle section of the fin 18, and the depressed sections of the cam pairs 17 and 19 in each case have an identical depth in relation to the contact plane of the friction ring 4, 5 with the wheel web 2 and an identical width in relation to the width of the friction ring 4, 5 in the radial direction in relation to the wheel 2. Here, the depression is configured so as to be symmetrical in each case with respect to the ring width of the friction ring 4, 5, with the result that the contact area of the respective fins or cams 14, 15, 16, 17, 18, 19 is as small as possible, but is large enough to maintain the surface pressure between the friction ring 4, 5 and the wheel web 2 at an acceptable level.

Figure 6:
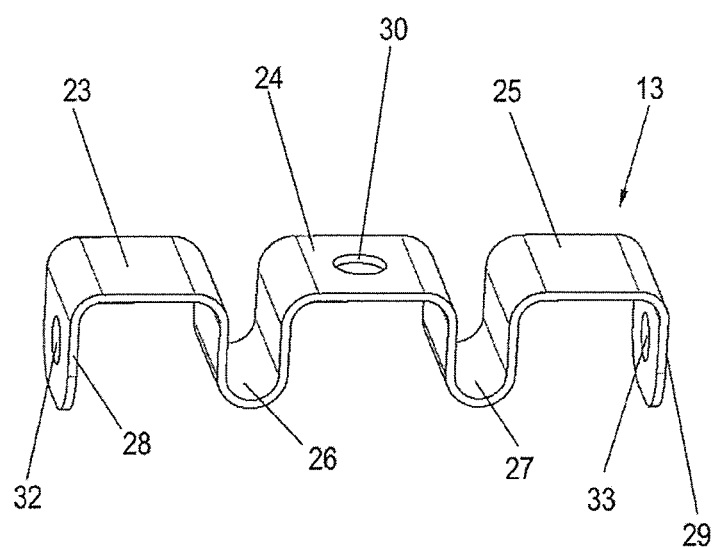
FIG. 6 shows a three-dimensional front view of one design embodiment of a strip-shaped spring element of a wheel brake disk.

In the design embodiment shown in FIGS. 4, 5 and 6 of a wheel brake disk 1, cams 21 and 22 are arranged in pairs on the friction rings 4, 5 in each case between the fins and cams 16 and 17 and between the cams and fins 19 and 14. The cam 21 is machined on its radial outer side in relation to the wheel 3, whereas the cam 22 is machined on its radial inner side in relation to the wheel 3, the axial boundary of the machining being formed by the solid part of the respective friction ring 4, 5, with the result that a corresponding step of the machined area is produced in the axial direction.

The spring element 13 of this design embodiment which is shown on its own in FIG. 6 is a bent part which is produced from a flat or strip material and has a geometry which is formed substantially from three plateaus 23, 24, 25 which are connected by two "valleys" 26, 27, the two ends of the spring element 13 being formed by two limbs 28, 29. The plateaus 23, 24, 25 all lie on the same horizontal plane and therefore bear against the wheel web 2 in the mounted state of the wheel brake disk 1. The limbs 28, 29 adjoin the respectively outer plateaus 23, 25 by way of a 90° bend and have a length in the axial length in relation to the wheel 3 which is greater than the depth t of the valleys 26, 27 of the spring element 13. As a result, the valley bottom in each case does not rest on the friction rings 4, 5. The geometry of the spring element 13 results in an axis of symmetry which extends perpendicularly through the plateau 24 of the spring element 13, embodiments with a non-symmetrical configuration of the spring element 13 also being possible. The bore 30, the axis of symmetry of which coincides with the axis of symmetry of the spring element 13 in the example which is shown in FIG. 4 and FIG. 5, is engaged through in the mounted state of the friction rings 4, 5 by in each case one screw (not shown), by way of which the friction rings 4, 5 are fastened to the wheel web 2, and which screw forms the primary screw connection of the friction rings 4, 5 to the wheel web 2. Correspondingly, the friction rings 4, 5 likewise have a bore 31 which is coaxial with respect to the bore 30.

In each case one limb 28, 29 of the spring element 13 which in each case forms the outer boundary of the spring element 13 in the radial direction in relation to the wheel 3 is supported on the machined surfaces of the cams 21, 22 in the axial direction in relation to the wheel 3. The spring element 13 is connected to the cams 21, 22 via the limbs 28, 29 and corresponding bores 32, 33 with suitable connecting elements (not shown).

The spring element 13 is configured in such a way that all relative movements which occur lie in terms of magnitude in the range of elastic deformation of the spring elements 13. This leads to the primary screw connection of the wheel brake disk 1 not performing a relative movement in the direction parallel to the wheel web 2, which completely prevents wear on the wheel web 2.

Moreover, the spring elements 13 are configured in such a way that their maximum geometrical moment of inertia can act in the circumferential direction and the spring elements 13 are thus deformed only slightly by the influence of the braking torque but nevertheless permit a radial expansion, that is to say a parallel displacement of the friction face with respect to the wheel as a result of thermal load.

Figure 7:
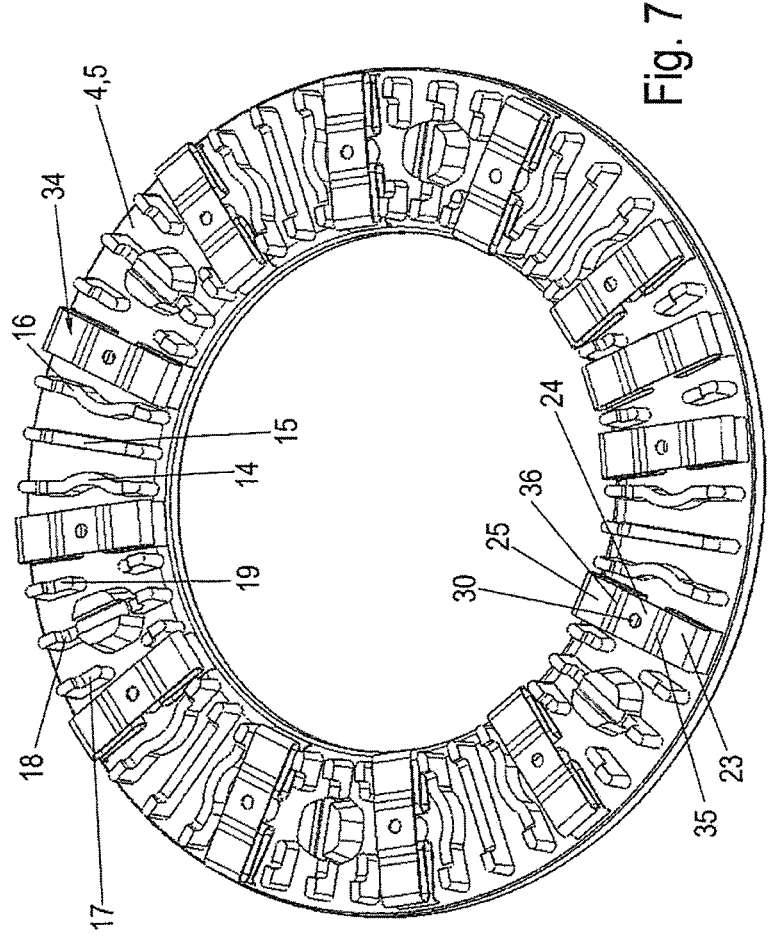
FIG. 7 shows a three-dimensional front view of a friction ring with inserted strip-shaped spring elements in a further design embodiment of a wheel brake disk.
Figure 8:
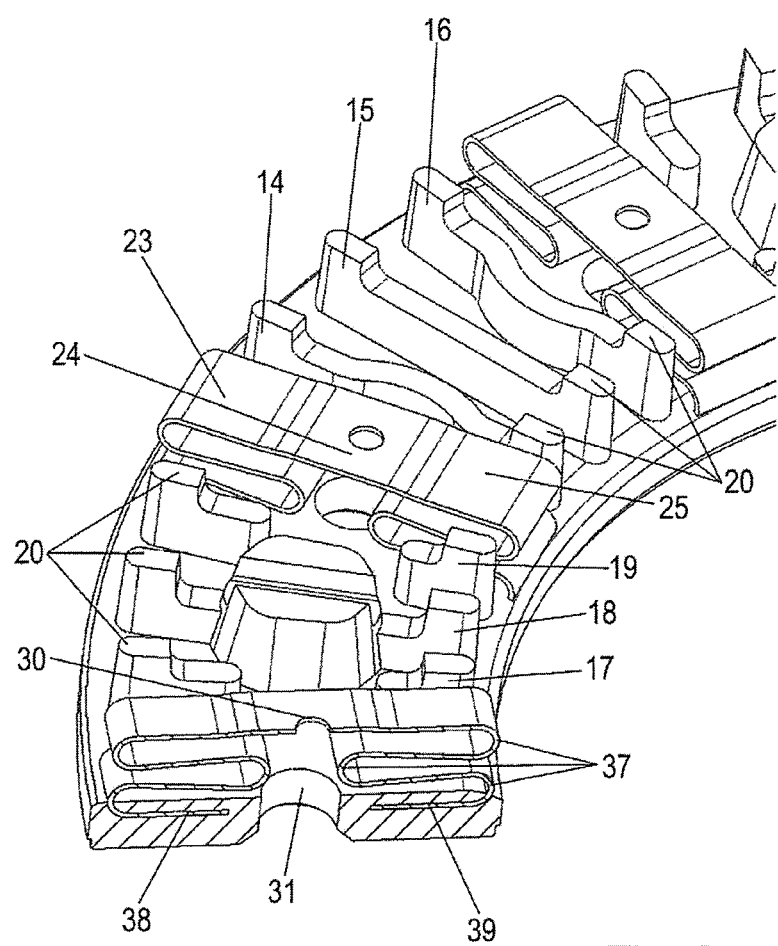
FIG. 8 shows an enlarged detail of the front view from FIG. 7 of a friction ring with a further design embodiment of the inserted strip-shaped spring elements of a wheel brake disk.
Figure 9:
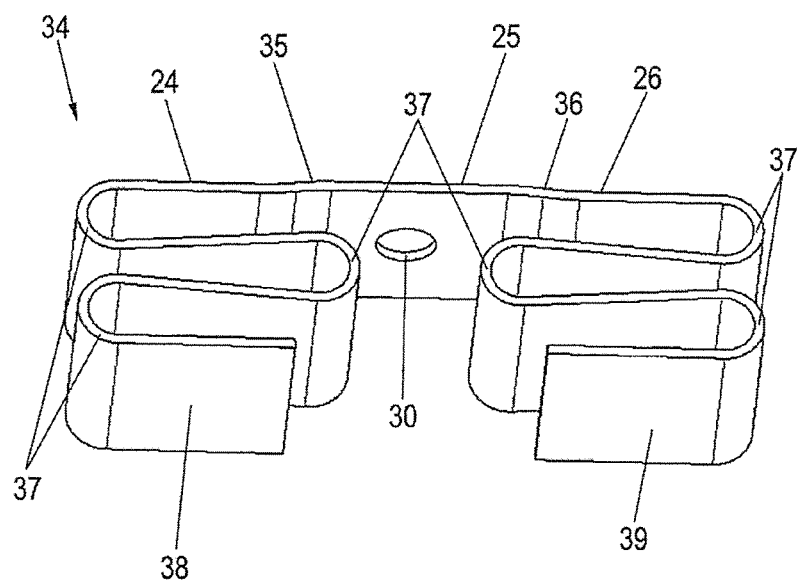
FIG. 9 shows a three-dimensional front view of a further design embodiment of a strip-shaped spring element of a wheel brake disk.

FIG. 7 shows a further design embodiment of a friction ring 4, 5 with inserted spring elements 34 of a wheel brake disk 1.

In a deviation from the design embodiment of the spring element 13 which is shown in FIGS. 4, 5 and 6, although the spring element 34 which is likewise a bent part which is produced from a flat or strip material also has plateaus 24, 25, 26, the plateau 25 is higher than the plateaus 24 and 26, with the result that the spring element 34 bears against the wheel web 2 only with the plateau 25 in the mounted state of the wheel brake disk 1. Moreover, the plateaus are not separated from one another by valleys 26, 27, but rather by transitions 35, 36 which connect the two different height levels of the plateau 25 and the two plateaus 24 and 26.

In each case at their ends, the plateaus 24 and 26 of the spring element 34 have at least two free accordion-like windings 37 of the strip steel which extend in the axial direction in relation to the wheel and act as springs. The windings 37 open at both ends in each case as a free end 38, 39, the free ends 38, 39 being cast in each case into the friction ring 4, 5 and thus being connected in an integrally joined manner to the friction ring 4, 5. Separate fastening of the spring element 34 via cams 21, 22, as in the case of the spring element 13, is dispensed with as a result.

In a further design embodiment which is not shown, the spring elements 34 can be cast in one piece together with the friction rings 4, 5 by way of corresponding cores. This is possible, in particular, if the friction rings 4, 5 are produced from a ductile casting material, such as cast iron with spheroidal graphite.

To improve the sound damping properties of the friction rings 4, 5, the spring elements 13, 34 can also be of double-layered configuration. From the vibrations of the friction rings 4, 5 which result during a braking operation and from the solid-borne sound which is produced as a result, damping is carried out effectively in this case as a result of the friction between the two spring element layers.

In DE 44 17 813, the two friction rings are centered by sliding blocks which act in a positively locking manner in the radial direction, with the result that the centering of the friction rings is maintained even in the case of heating during the braking operation. So that the deformation of the friction rings on account of the thermal loading does not result in the conical deformation of the friction rings, cooling fins are attached to the friction rings, via which cooling fins the friction rings are supported on the wheel disk of the rail vehicle wheel. The sliding blocks have integrated radial springs, i.e., feather keys. The feather keys permit displacements as a consequence of the thermal expansion during a braking operation. The screw connections, by way of which the friction rings are fastened to the wheel disk, are equipped with conical clamping disks to increase the elasticity and to reduce the amount of settling.

DE 42 11 847 also addresses the theme of compensating for the thermal stresses which are caused on account of the heat input as a result of the braking operation. To this end, DE 42 11 847 proposes that centering rings which are inserted with radial prestress between the connecting means and the walls of the bores are composed of an elastic material which loses its consistency during heating in accordance with the operating temperature of the brake disk. Here, the centering rings are arranged in the component which expands during heating. This is the case for the friction rings.

DE 100 47 980 likewise makes reference to the required radial displaceability of the connecting bolts relative to the sliding blocks which are arranged concentrically with respect to the connecting bolts to compensate for thermally induced expansion and contraction.

As a result of the construction of a wheel brake disk, in which the wheel brake disk is formed by way of two friction rings being screwed to the wheel web, the wheel web lying symmetrically between the two friction rings, the screw connection of the two friction rings of the wheel brake disk is loaded during a braking operation with a thermal and mechanical additional force which results from the thermal expansion of the brake disk.

As a result, the brake disk is deformed, it becomes "domed" and, as a result, extends the screw by a corresponding amount. In addition, the brake disk slides on the wheel web toward the outside in the radial direction.

The additional force and the associated relative movement of the disk with screw connection results in corresponding performance limits of a corresponding wheel brake disk with regard to the braking intensity and the braking performance. These parameters have to lie within limits which are reasonable for the service life of the brake disk.

For example, the brake disk can dig into the wheel or into the wheel web as a result of the pressing force of the screw which acts and the radial expansion which results from the thermal load. As a result, there is the risk that this causes wear on the wheel web according to its magnitude, which wear leads to the complete loss of the prestressing force of the screw connection, with the result that the screw connection can no longer fulfill its function.

Furthermore, a fatigue fracture of the screw can occur by way of the additional, cyclical longitudinal extension of the screw as a result of the thermomechanical loading of the friction rings.

LIST OF DESIGNATIONS

1 Wheel brake disk
2 Wheel web
3 Wheel
4 Friction ring
5 Friction ring
6 Fin
7 Screw head
8 Sleeve
9 Nut
10 Sliding block
11 Groove
12 Ring
13 Spring element
14 Fin
15 Fin
16 Fin
17 Cam pair
18 Fin
19 Cam pair
20 End
21 Cam
22 Cam
23 Plateau
24 Plateau
25 Plateau
26 Valley
27 Valley
28 Limb
29 Limb
30 Bore
31 Bore
32 Bore
33 Bore
34 Spring element
35 Transition
36 Transition
37 Winding
38 Free end
39 Free end

The invention claimed is:

1. A wheel brake disk assembly for a wheel of a rail vehicle, the wheel assembly comprising:
    a wheel web, on which friction rings are supported which are fastened to the wheel web, wherein each friction ring has a plurality of spring elements which are arranged on the circumference of the friction rings, the spring elements being arranged in the mounted state of the wheel brake disk assembly between the friction rings and the wheel web,
    wherein the spring elements have three plateaus connected by two valleys.

2. The wheel brake disk assembly of claim 1, wherein the spring elements are arranged at the locations, at which at least one of the friction rings is connected by connecting elements to the wheel web.

3. The wheel brake disk assembly of claim 1, wherein the spring elements have a strip-shaped basic geometry.

4. The wheel brake disk assembly of claim 1, wherein the spring elements are arranged uniformly on the circumference of at least one of the friction rings.

5. The wheel brake disk assembly of claim 1, wherein the number of spring elements which are arranged on the circumference of at least one of the friction rings corresponds to a prime number.

6. The wheel brake disk assembly of claim 1, wherein the spring elements are connected in a non-positive manner in each case to a friction ring in the mounted state of the wheel brake disk assembly.

7. The wheel brake disk assembly of claim 1, wherein the spring elements are supported on cams.

8. The wheel brake disk assembly of claim 7, wherein the cams which are arranged on at least one of the friction rings are connected in one piece to the at least one of the friction rings.

9. The wheel brake disk assembly of claim 1, wherein the spring elements are supported on cams which are arranged on at least one of the friction rings.

10. The wheel brake disk assembly of claim 1, wherein the friction rings have at least one pattern of fins or cams.

11. The wheel brake disk assembly of claim 10, wherein the at least one pattern of fins or cams are distributed uniformly on the circumference of a friction ring.

12. The wheel brake disk assembly of claim 11, wherein the number of the at least one pattern of fins or cams which are arranged on the circumference of a friction ring corresponds to a prime number.

13. The wheel brake disk assembly of claim 11, wherein the at least one pattern of fins or cams has a symmetry.

14. The wheel brake disk assembly of claim 11, wherein the friction rings have two different patterns of fins and cams.

15. The wheel brake disk assembly of claim 14, wherein the arrangement of the two different patterns of fins and cams alternates on the circumference of the friction rings in front of or behind the position of a spring element.

16. The wheel brake disk assembly of claim 14, wherein the fins and cams are arranged on the circumference of the friction rings in a radial direction in relation to the wheel.

17. The wheel brake disk assembly of claim 14, wherein the fins and cams are arranged on the circumference of the friction rings in a beam-shaped radial direction in relation to the wheel.

18. The wheel brake disk assembly of claim 14, wherein the fins and cams are arranged on the circumference of the friction rings symmetrically with respect to the width of the friction rings.

19. The wheel brake disk assembly of claim 14, wherein the fins are produced on the circumference of the friction rings in one piece with one friction ring by a primary forming process.

20. The wheel brake disk assembly of claim 14, wherein the fins and cams have a uniform height at their ends.

21. The wheel brake disk assembly of claim 14, wherein the fins and cams have a height between their respective ends, which height is lower than the height at their respective ends.

22. The wheel brake disk assembly of claim 14, wherein the friction rings bear against the wheel web of the wheel via the ends of the fins and cams.

23. The wheel brake disk assembly of claim 11, wherein the at least one pattern of fins or cams is distributed six times on the circumference of a friction ring.

24. The wheel brake disk assembly of claim 1, wherein each of the spring elements bears against the wheel web via at least one plateau in the mounted state of the wheel brake disk.

25. The wheel brake disk assembly of claim 1, wherein each of the spring elements is configured in such a way that its maximum geometrical moment of inertia acts in the circumferential direction of the wheel brake disk.

26. A wheel having a wheel brake disk, the wheel brake disk having a wheel web, on which friction rings are supported which are fastened to the wheel web, wherein each friction ring has a plurality of spring elements which are arranged on the circumference of the friction rings, the spring elements being arranged in the mounted state of the wheel brake disk between the friction rings and the wheel web,
    wherein the friction rings have at least one pattern of fins or cams,
    wherein the fins and cams have a height between their respective ends, which height is lower than the height at their respective ends so that the fins or cams bear against the wheel web only at their respective ends.

* * * * *